(12) United States Patent
Arris et al.

(10) Patent No.: US 6,215,613 B1
(45) Date of Patent: Apr. 10, 2001

(54) CARTRIDGE TAPE DOOR OPENING APPARATUS FOR USE WITH TAPE CARTRIDGES HAVING DIFFERING SIZE FORMATS

(75) Inventors: Robert L. Arris; Fred O. Stephens; Charles L. Hunter, all of Loveland; Jonathan D. Bassett, Ft. Collins, all of CO (US)

(73) Assignee: Hewlett-Packard Company, Palo Alto, GA (US)

( * ) Notice: Subject to any disclaimer, the term of this patent is extended or adjusted under 35 U.S.C. 154(b) by 671 days.

(21) Appl. No.: 08/534,149

(22) Filed: Sep. 26, 1995

(51) Int. Cl.[7] .................................................. G11B 5/008
(52) U.S. Cl. ............................................. 360/96.5
(58) Field of Search ........................... 360/93, 96.5, 96.6

(56) References Cited

U.S. PATENT DOCUMENTS

| 4,556,923 | 12/1985 | Olmsted | 360/93 |
|---|---|---|---|
| 5,025,334 | 6/1991 | Perona et al. | 360/96 |
| 5,109,308 | * 4/1992 | Kukreja et al. | 360/96.5 |
| 5,371,639 | * 12/1994 | Bryer | 360/96.5 |

* cited by examiner

Primary Examiner—David Davis

(57) ABSTRACT

A cartridge tape door opener for DC2000 and TRAVAN tape cartridges. The present invention utilizes a rotatable arm to engage a rear edge of a tape door located on the tape cartridges. The interaction of the rotatable arm with the tape door edge causes the tape door to rotate open allowing access to magnetic tape inside the tape cartridge by a read/write head. This rotatable arm is spring loaded such that once the tape door is opened, the arm can be moved to the side and out of the way of an TRAVAN tape cartridge. When a DC2000 tape cartridge is used, the rotatable arm acts as a fixed door opening rail and does not rotate. By utilizing this new tape door opener, both types of tape cartridges may be used in a single tape drive.

4 Claims, 11 Drawing Sheets

CARTRIDGE TAPE DOOR OPENING APPARATUS FOR USE WITH TAPE CARTRIDGES HAVING DIFFERING SIZE FORMATS

FIELD OF THE INVENTION

The present invention relates to cartridge tape drives. In particular, the present invention is an apparatus to open the protective door of a cartridge tape when the tape cartridge is inserted into a tape drive.

BACKGROUND OF THE INVENTION

Cartridge tape drives are widely used in the computer industry for backing up data on hard disks. These drives utilize tape cartridges which consist of reels of magnetic tape mounted within a plastic and metal protective cartridge. In front of each cartridge is a door which must be rotated open to allow a read/write head located inside the tape drive to contact the magnetic tape within the tape cartridge.

Unfortunately all tape cartridges do not use the same size format. As such, a tape cartridge door opener which was designed to work for an industry standard DC2000 tape cartridge may not work for the newly introduced TRAVAN tape cartridge made by 3M corporation. Typically a fixed rail was used by prior art tape drives to open the DC2000 tape door. This rail would cause the tape door to open as the cartridge was pushed inside the tape drive. As the door opened, a gap was opened up into which the fixed rail would fit thereby allowing the tape cartridge to continue to be inserted fully into the tape drive.

The TRAVAN tape cartridge design precludes a fixed rail type of tape door opener as has been utilized in the industry for the DC2000. Because of the side design of the TRAVAN cartridge, a fixed rail would hit the side features of the cartridge and prevent the cartridge from being fully inserted into the tape drive.

FIG. 1 illustrates a DC2000 size format tape cartridge and FIG. 2 illustrates an TRAVAN tape cartridge. As can be readily seen from a comparison of FIGS. 1 and 2, the TRAVAN tape cartridge side 201 does not have a slot as does the DC2000 (101). While not illustrated, the left and right sides of the tape cartridges are substantially symmetrical. Since the TRAVAN is missing a slot such as 101, a fixed rail door opener will strike the side of the TRAVAN cartridge thereby preventing the full insertion of the cartridge into the tape drive.

To allow both a DC2000 and an TRAVAN cartridge to be utilized in a single tape drive, a different door opening mechanism is required.

SUMMARY OF THE INVENTION

The present invention is a tape cartridge door opener which will open both a DC2000 and an TRAVAN tape cartridge when either tape cartridge is inserted into a tape drive. This inventive apparatus consists of a rotatable arm that is loaded by a torsion spring. When a tape cartridge is inserted into a tape drive equipped with this inventive door opener, the end of the rotatable arm pushes open the tape door. In the case of a DC2000 cartridge, after the door is opened the arm slides into a slot in the side of the cartridge thereby permitting the cartridge to be fully inserted into the tape drive. In the case of an TRAVAN cartridge, after the door is opened the arm is pushed out of the way by the side of the cartridge again permitting the cartridge to be fully inserted into the tape drive.

The torsion spring serves to position the end of the arm such that it will open the tape door of either cartridge. Additionally, when an TRAVAN cartridge is being used, the spring also allows the arm to be pushed out of the way as the cartridge is inserted into the tape drive.

DETAILED DESCRIPTION OF THE INVENTION

The present invention is an apparatus which will open the protective tape door of either a DC2000 or an TRAVAN tape cartridge. This apparatus interacts with the tape door which is mounted by a pivot pin to the tape cartridge housing. When the tape cartridge is out of the tape drive, the tape door is held in a closed position by a torsion spring within the tape cartridge assembly.

The opening of a cartridge tape door is accomplished automatically during the insertion of a tape cartridge into a tape drive. As the cartridge is inserted into the tape drive, the rear edge of the tape door is forced into an end of a rotatable arm. This action forces the tape door to rotate into an open position. After the tape door is open, the arm either slides into a side grove in the cartridge or is forces to the side and out of the way so that an TRAVAN cartridge can be fully inserted into the tape drive.

The operation of the present invention can best be understood by examining the tape door operation during the insertion of an TRAVAN tape cartridge. The following discussion details the operation of the apparatus.

Figure 1:
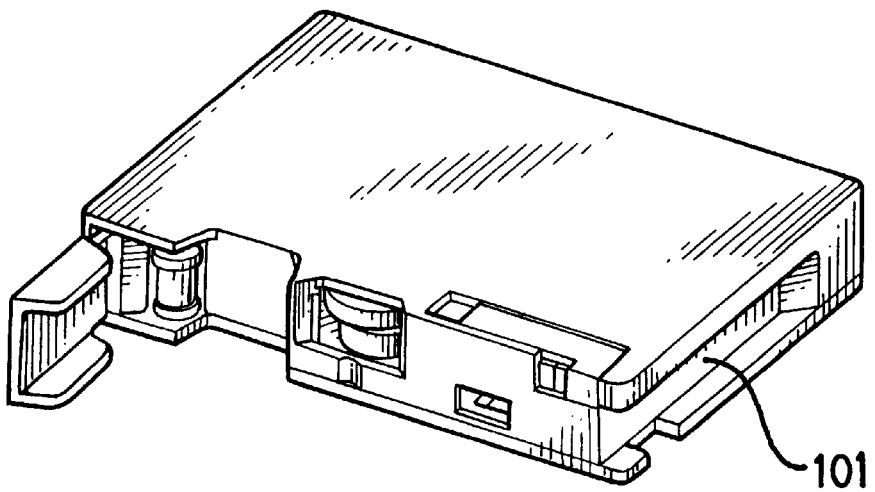
FIG. 1 illustrates a DC2000 tape cartridge.
Figure 2:
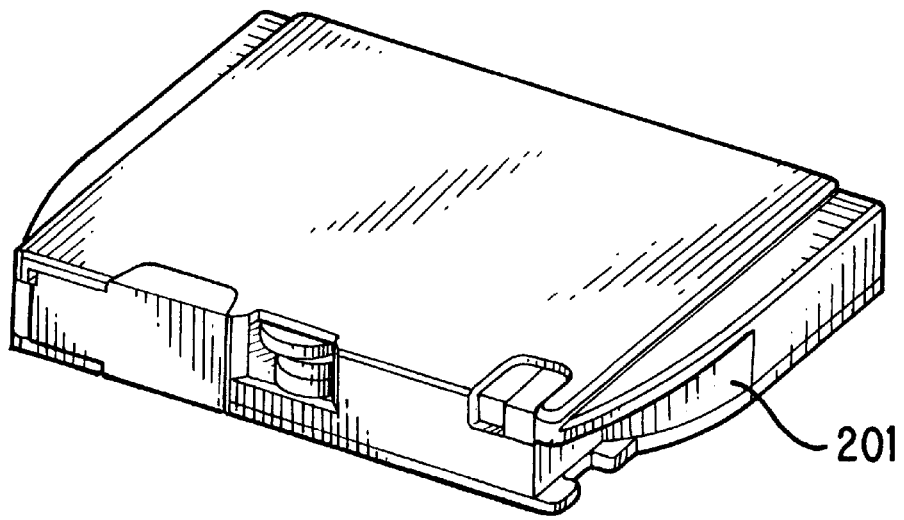
FIG. 2 illustrates an TRAVAN tape cartridge.
Figure 3:
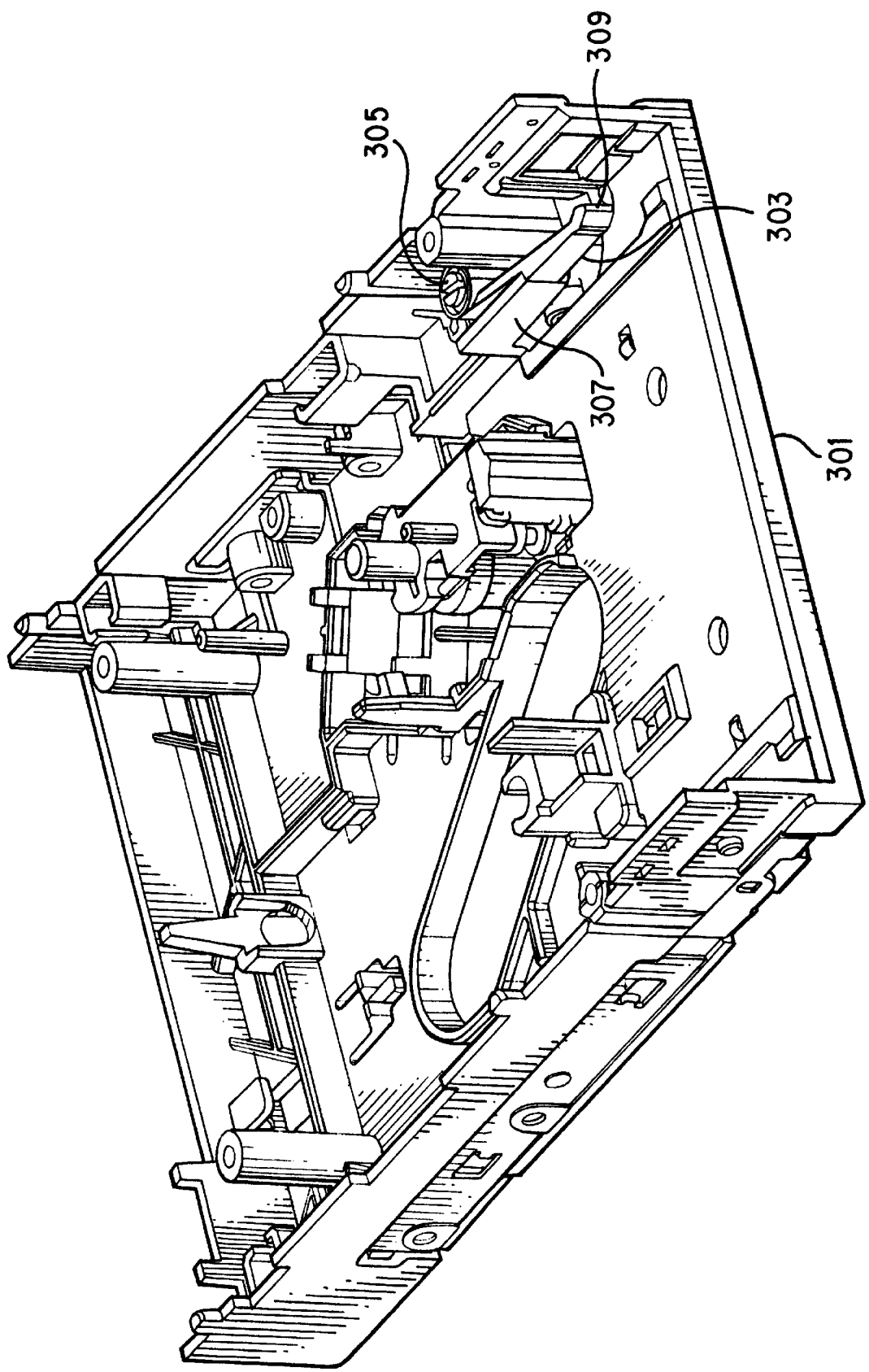
FIG. 3 illustrates a tape drive incorporating the present invention.

FIG. 3 illustrates a tape drive chassis incorporating the present invention. As shown, a tape chassis 301 includes a rotating arm 303 biased by a torsion spring 305 against a stop wall 307. The end 309 of the rotating arm 303 is positioned within the chassis such that it will strike the rear edge of a tape cartridge door when a tape cartridge is inserted into the chassis.

Figure 4:
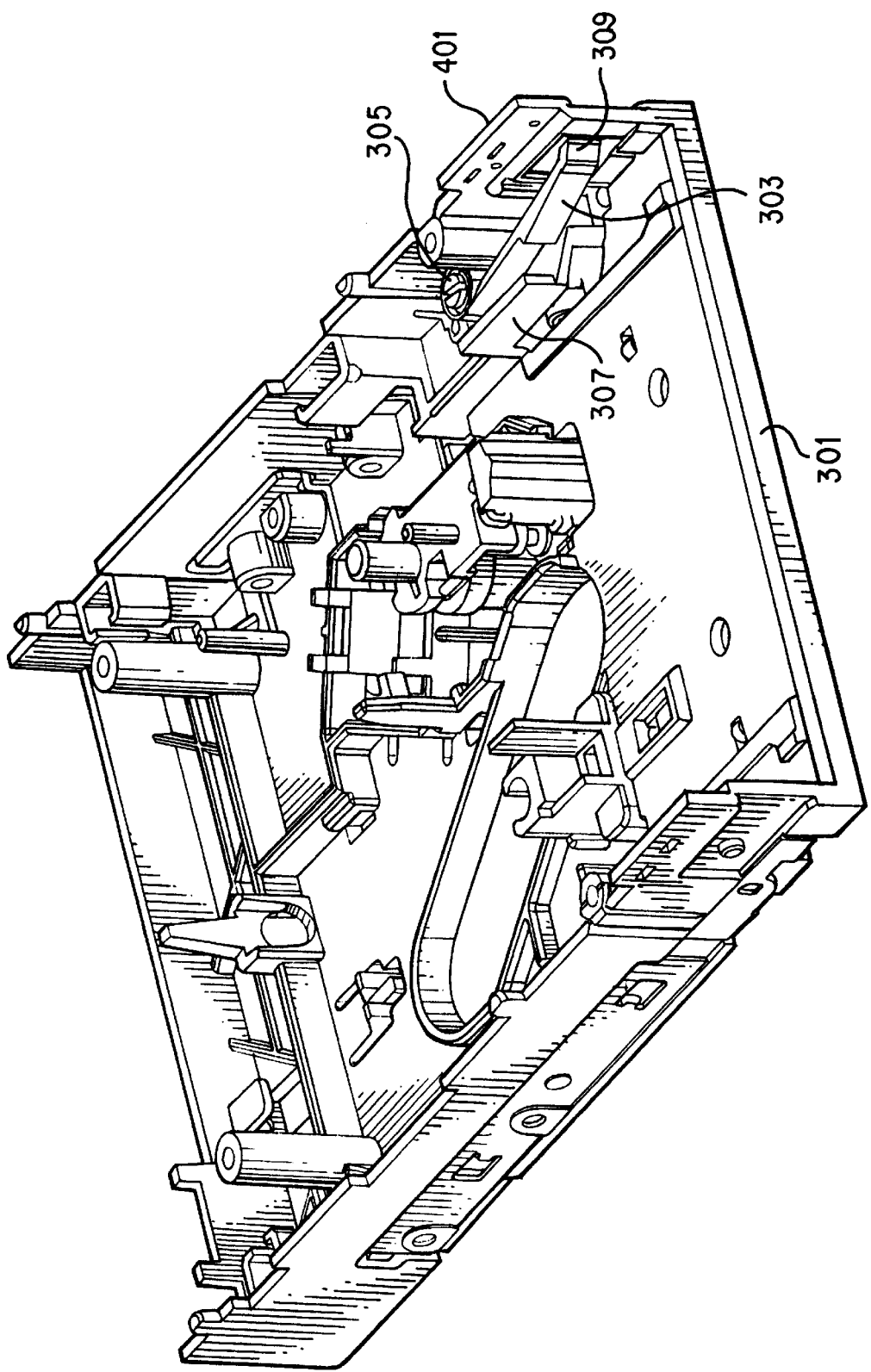
FIG. 4 illustrates the present invention in a deflected position.

FIG. 4 illustrates the rotating arm 303 pushed to the right side 401 of the tape chassis. This is the position the arm will be forced into when an TRAVAN tape cartridge is inserted into the chassis. The torsion spring 305 serves to force the rotating arm toward the stop wall 307 such that after a cartridge is removed from the chassis, the rotating arm 303 is forced back into proper position against the stop wall and thereby be in position to open a cartridge tape door again.

Figure 5:
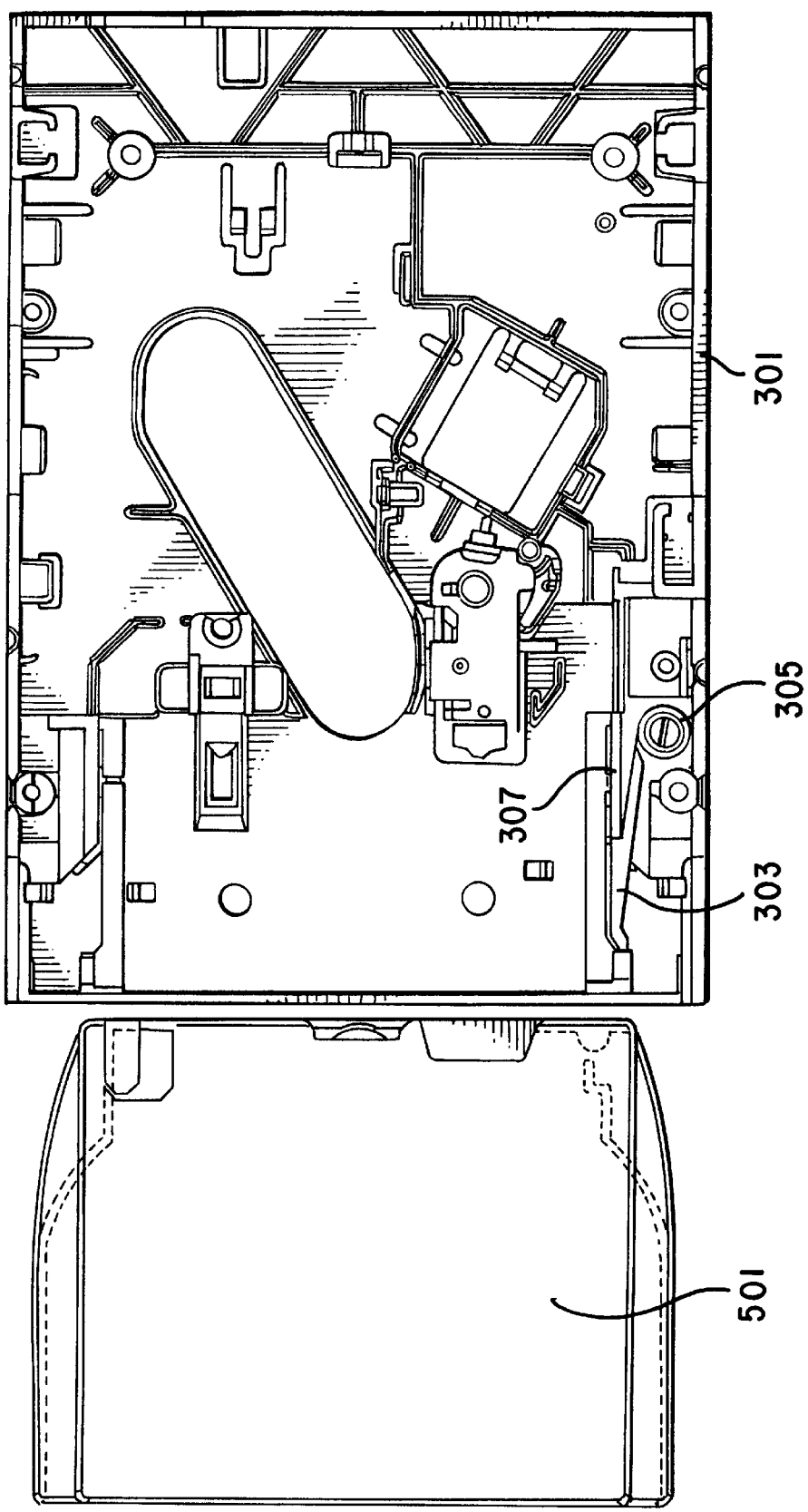
FIGS. 5–12 illustrate the interaction of the present invention with an TRAVAN tape cartridge when the tape cartridge is inserted into a tape drive chassis.

FIG. 5 illustrates an TRAVAN cartridge 501 positioned to be inserted into the tape chassis 301. As shown, the rotating arm 303 is positioned against the stop wall 307.

Figure 6:
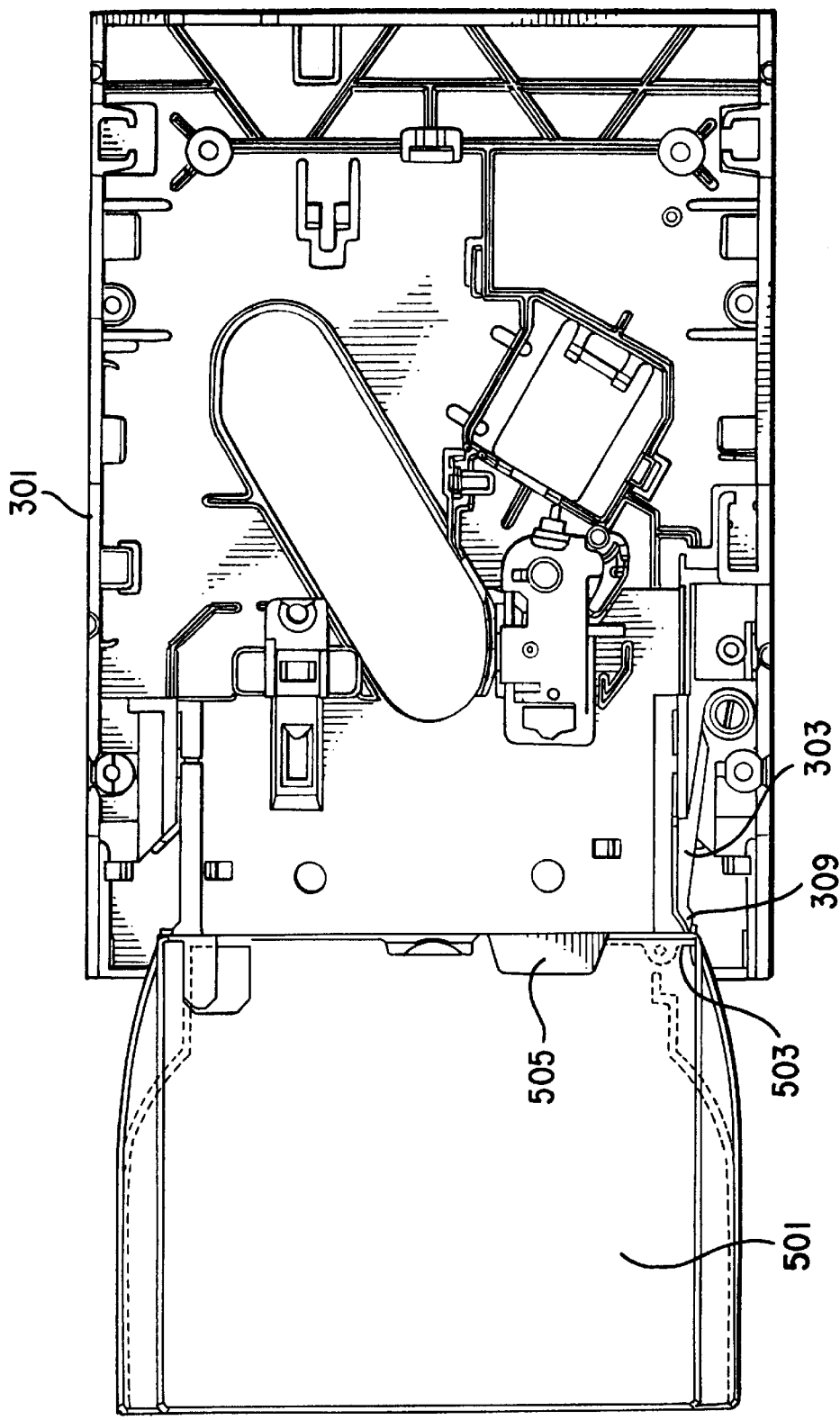

FIG. 6 illustrates the TRAVAN cartridge 501 inserted until the rear edge 503 of the tape door 505 contacts the end 309 of the rotating arm 303.

Figure 7:
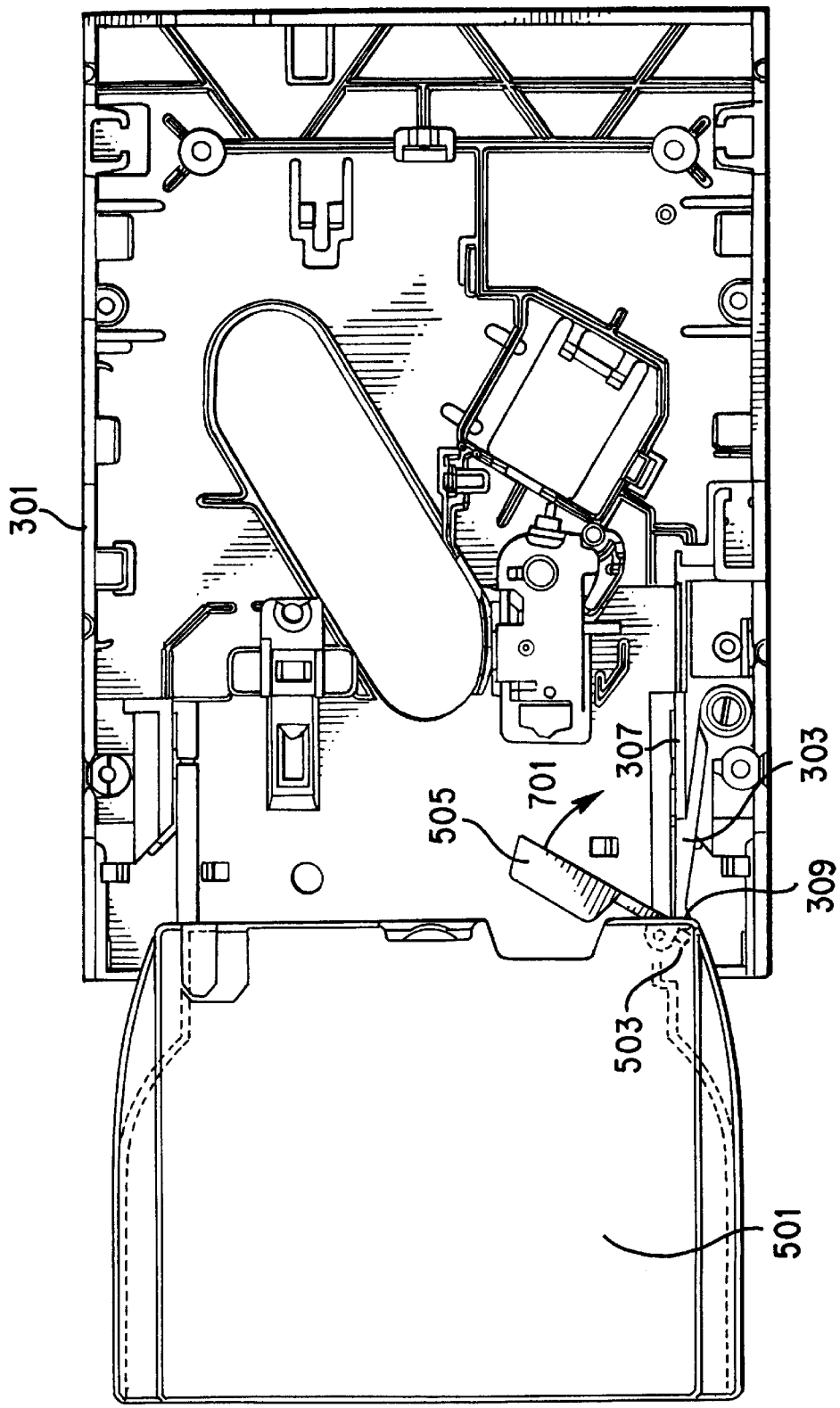

FIG. 7 illustrates the cartridge 501 at a point inside the chassis 301 where the end 309 of the rotating arm 303 has caused the tape door 505 to swing open the direction indicated by arrow 701. In this position, the rotating arm 303 is still positioned against the stop wall 307.

Figure 8:
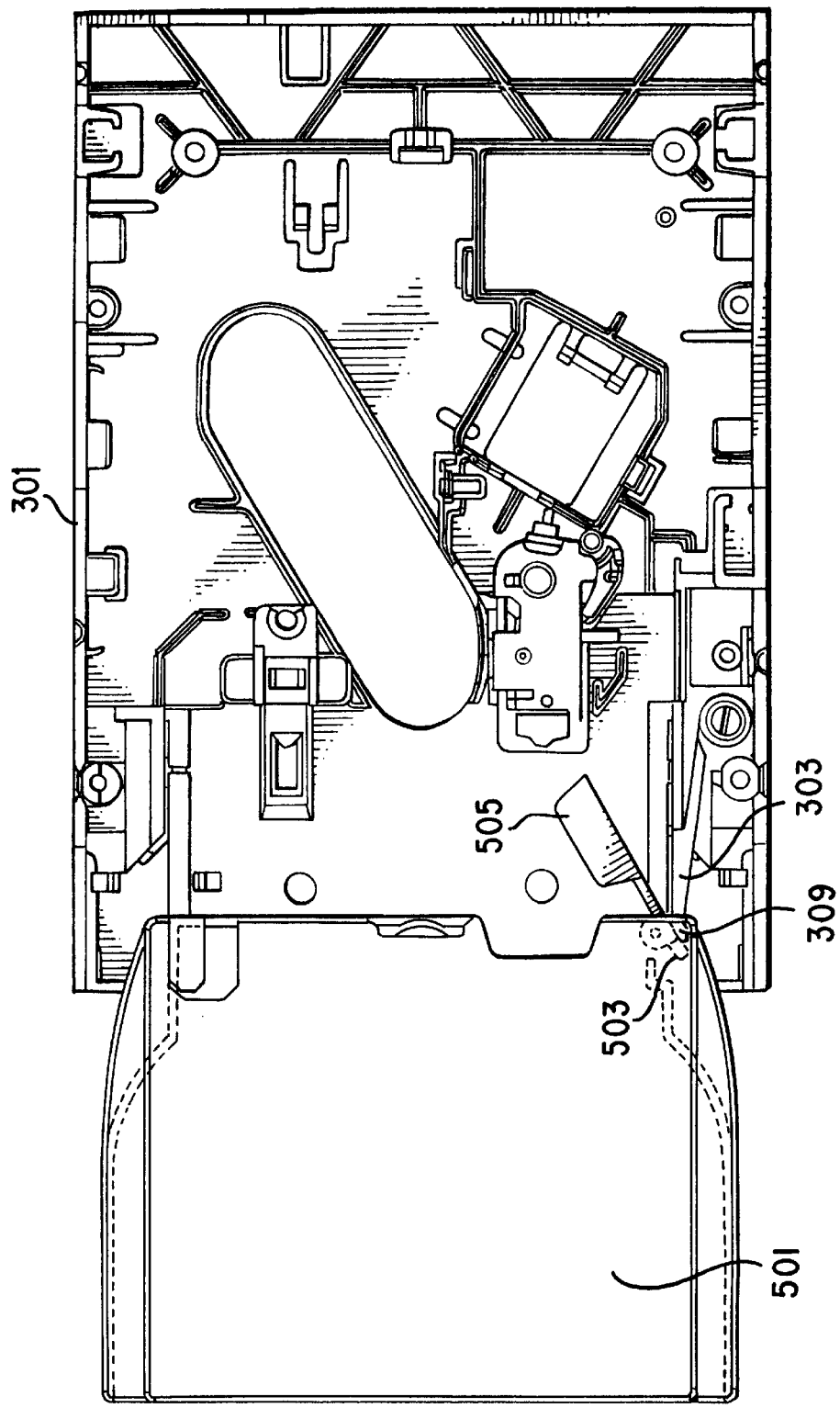

FIG. 8 illustrates the tape cartridge 501 inserted further into the chassis than in FIG. 7. In this position, the tape door 505 is opened more by the interaction of the end 309 of the rotating arm 303 and the rear edge 503 of the tape door. The rotating arm is still positioned against the stop wall 307.

Figure 9:
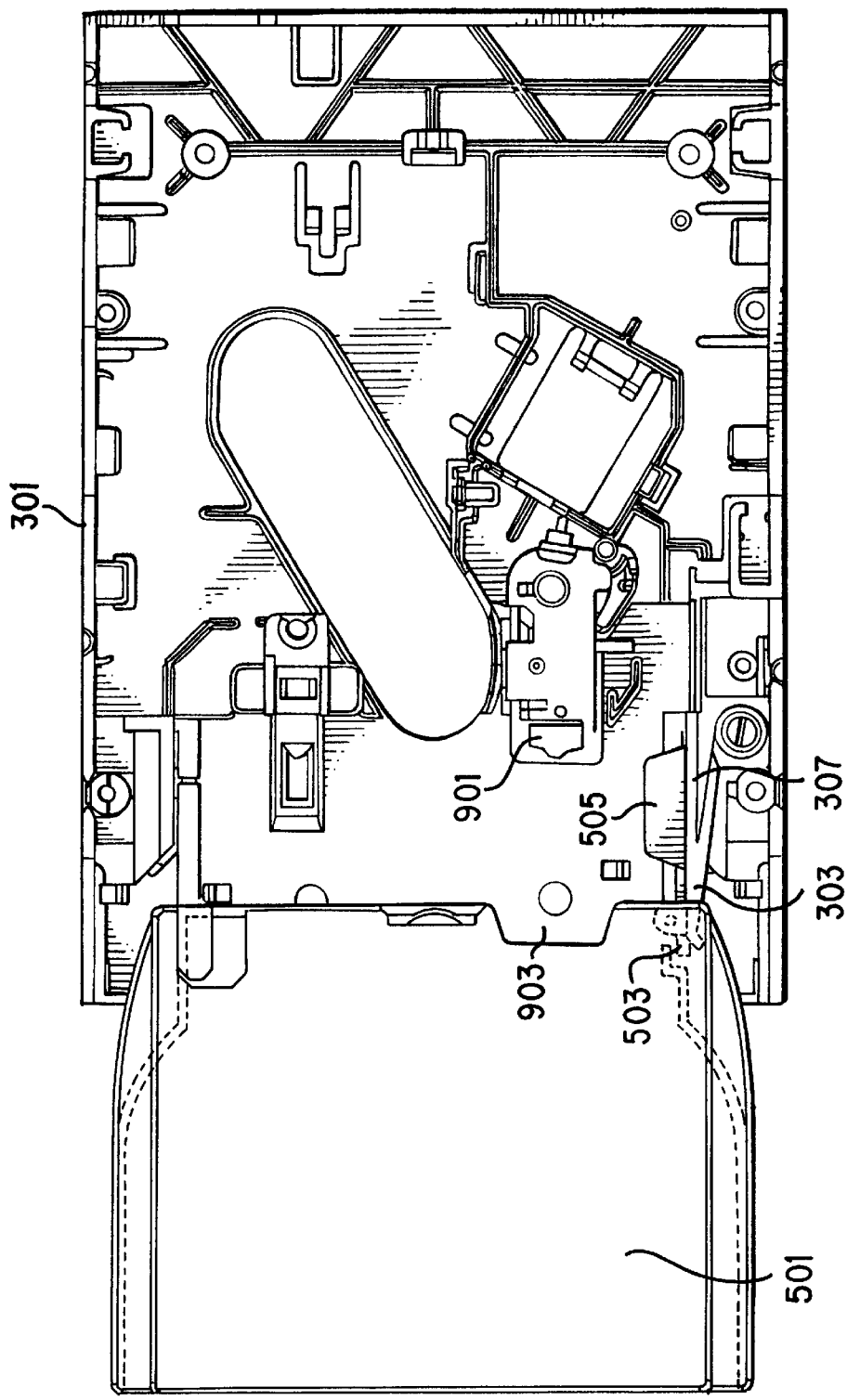

FIG. 9 illustrates the tape cartridge 501 inserted into the chassis 301 such that the tape door 505 is been forced fully open allowing access by a read/write head 901 to the tape area 903. The end 309 of the rotating arm 303 is now positioned adjacent to the rear edge 503 of the tape door 505.

Figure 10:
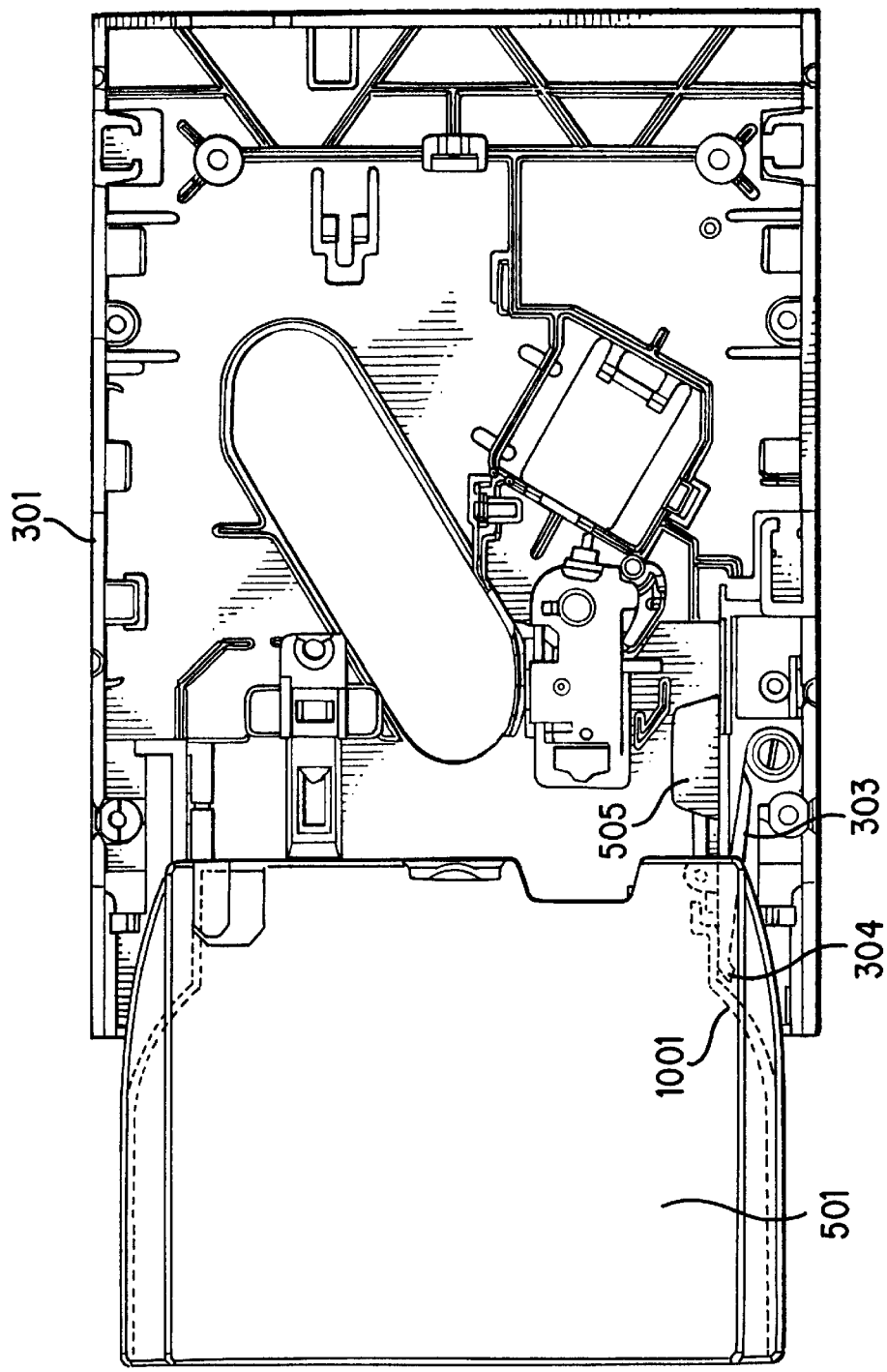

FIG. 10 illustrates the tape cartridge inserted into the chassis such that the end 309 of the rotating arm 303 is positioned abutting a curved feature 1001 of the cartridge 501.

Figure 11:
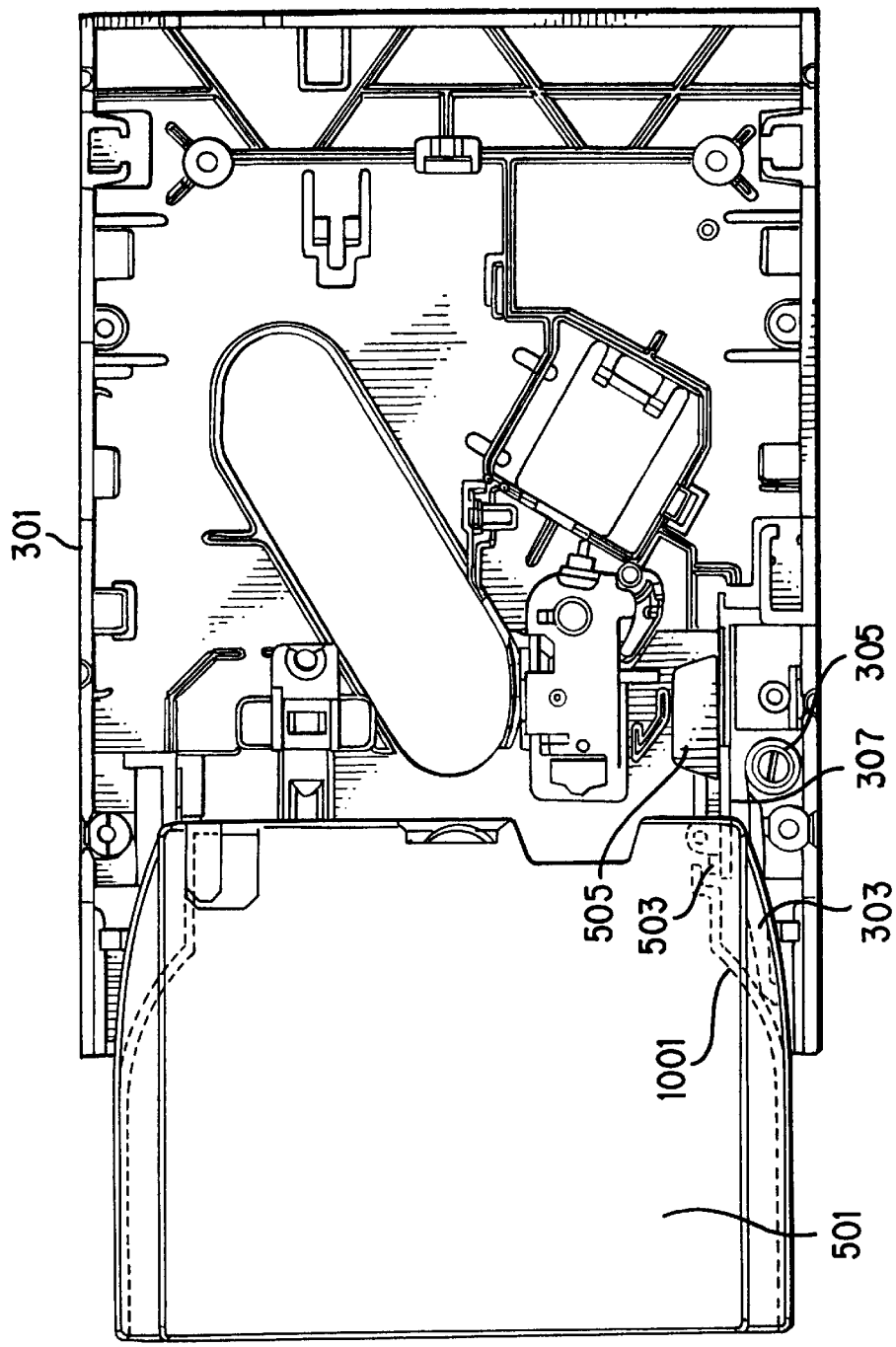

FIG. 11 illustrates the tape cartridge inserted into the chassis further so that the curved feature 1001 has forces the rotating arm 303 to rotate away from the stop wall 307. In this position the stop wall 307 prevents the tape door 505 from closing and the rotating arm is no longer needed.

Figure 12:
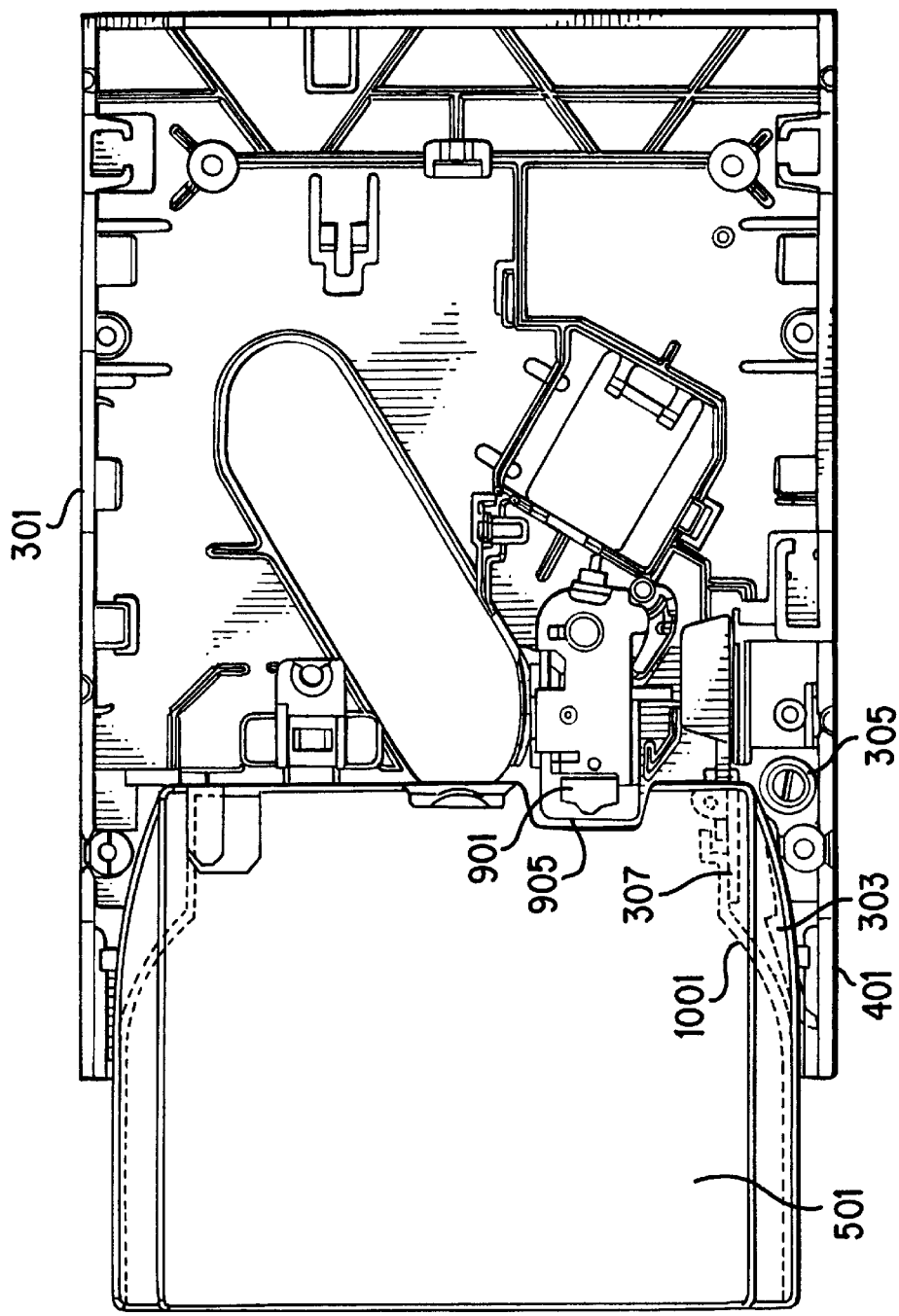

FIG. 12 illustrates the tape cartridge fully inserted into the chassis. In this position, the curved feature 1001 of the tape cartridge 501 has forced the rotating arm 303 to the side 401 of the chassis 301 where it does not interfere with the tape cartridge. This movement of the rotating arm has increased the tension of the torsion spring 305 and the read/write head 901 is now properly positioned within the tape access area 905.

The operation of this invention has been illustrated with an TRAVAN tape cartridge but this apparatus also works with a DC2000 tape cartridge. However with the DC2000 cartridge, the rotating arm 303 does not rotate but acts as a fixed door opening rail as is known in the industry.

The torsion spring 305 may be a flat helical torsion spring or a round-wire torsion spring or other spring system such as a cantilever spring which biases the rotating arm against the stop wall 307 and does not interfere with the full insertion of a tape cartridge. The rotating arm 303 can be mounted to the spring 305 or mounted directly to the chassis by a pivot mount. In the case where the rotating arm 303 is mounted to the spring 305, the rotating arm can be an extension of the spring itself or a separate member which is attached to the spring.

While a preferred embodiment of the invention has been described, other embodiments of the invention will be apparent to those skilled in the art from a consideration of this specification or practice of the invention disclosed herein. Therefore it is intended that the specification and particular example be considered as exemplary only, with the scope of the invention being defined by the following claims.

We claim:

1. An apparatus for opening a door in a tape cartridge, the door covering an opening in an edge wall of the tape cartridge, the door having a rear edge, the apparatus mounted in a tape drive, the tape drive including a chassis and a magnetic head, the apparatus comprising:

a rotating arm rotatably attached to the chassis such that the rotating arm is free to rotate in an arc and the rotating arm having a door engaging end; and the door engaging end positioned so that when a tape cartridge is inserted into the tape drive in a direction transverse to the edge wall with the edge wall moving towards the magnetic head, the rear edge of the door is forced against the door engaging end of the rotating arm, forcing the door open.

2. The apparatus of claim 1 further comprising:

a stop wall;

a spring that operates to rotate the rotating arm; and the stop wall positioned to constrain the rotating arm against the spring bias in a position for the door engaging end to contact the rear edge of the door as the tape cartridge is inserted into the tape drive.

3. The apparatus of claim 2 further comprising:

when the tape cartridge is inserted further into the drive after the door engaging end of the rotating arm has forced the door open, further insertion of the tape cartridge into the tape drive causes the door engaging end of the rotating arm to contact the tape cartridge, forcing the rotating arm away from the stop wall and preventing interference between the rotating arm and the cartridge.

4. The apparatus of claim 2 further comprising:

when the tape cartridge is inserted further into the drive after the door engaging end of the rotating arm has forced the door open, the rear edge of the door contacts the stop wall, the stop wall thereby holding the door open.

* * * * *